United States Patent
Inglese

(10) Patent No.: US 12,195,959 B2
(45) Date of Patent: Jan. 14, 2025

(54) FIBER REINFORCED POLYMER BUILDING SYSTEMS AND METHODS

(71) Applicant: Paul A. Inglese, Naples, FL (US)

(72) Inventor: Paul A. Inglese, Naples, FL (US)

(73) Assignee: NORTHSTAR TECHNOLOGIES GROUP INC., Bonita Springs, FL (US)

( * ) Notice: Subject to any disclaimer, the term of this patent is extended or adjusted under 35 U.S.C. 154(b) by 0 days.

(21) Appl. No.: 18/126,987

(22) Filed: Mar. 27, 2023

(65) Prior Publication Data
US 2023/0250633 A1  Aug. 10, 2023

Related U.S. Application Data

(62) Division of application No. 17/093,262, filed on Nov. 9, 2020, now Pat. No. 11,613,891.

(60) Provisional application No. 63/069,972, filed on Aug. 25, 2020.

(51) Int. Cl.
*E04B 2/56* (2006.01)
*E04B 1/76* (2006.01)

(52) U.S. Cl.
CPC .............. *E04B 2/56* (2013.01); *E04B 1/762* (2013.01); *E04B 2001/7691* (2013.01); *E04B 2103/04* (2013.01)

(58) Field of Classification Search
CPC .... E04B 2/56; E04B 1/762; E04B 2001/7691; E04B 2103/04; H02S 20/23
See application file for complete search history.

(56) References Cited

U.S. PATENT DOCUMENTS

| | | | |
|---|---|---|---|
| 3,070,845 A | 1/1963 | Cheskin | |
| 3,628,232 A | 12/1971 | Brewer | |
| 4,205,657 A * | 6/1980 | Kelly | F24S 10/20 136/246 |
| 4,602,467 A | 7/1986 | Schilger | |
| 4,885,884 A | 12/1989 | Schilger | |

(Continued)

FOREIGN PATENT DOCUMENTS

| | | |
|---|---|---|
| WO | 2006/116417 | 11/2006 |
| WO | 2015/061865 | 5/2015 |

OTHER PUBLICATIONS

S. Bakhtiyari, et al.; "An Investigation on Fire Hazard and Smoke Toxicity of Epoxy FRP Composites"; Int. Journal on Disaster Resilience in the Built Environment, 8(3). 2017.

(Continued)

*Primary Examiner* — Beth A Stephan
(74) *Attorney, Agent, or Firm* — Steven J Shattil

(57) ABSTRACT

An apparatus comprises a solar panel or solar tile; and a pultrusion fiber reinforced polymer (PFRP) bracket connected to the solar panel or solar tile. The PFRP bracket mounts the solar panel or solar tile on a roof, and is configured to elevate the solar panel or solar tile a sufficient amount above the roof to enable airflow to occur under the solar panel or solar tile. The PFRP material comprises fibers embedded in a resin matrix. Exemplary fibers are glass, carbon, and synthetic fibers. PFRP products can be formed using a pultrusion method that eliminates outgassing. An intumescent fire barrier can be applied to the PFRP to meet National Fire Protection Association fire endurance codes and standards.

6 Claims, 20 Drawing Sheets

(56) References Cited

U.S. PATENT DOCUMENTS

| | | | |
|---|---|---|---|
| 5,014,770 A * | 5/1991 | Palmer | F24F 5/0046 |
| | | | 165/48.2 |
| 5,152,114 A | 10/1992 | Beazley et al. | |
| 6,092,340 A | 7/2000 | Simmons | |
| 6,151,858 A | 11/2000 | Ruiz et al. | |
| 6,212,849 B1 | 4/2001 | Pellock | |
| 6,314,704 B1 | 11/2001 | Bryant | |
| 6,427,403 B1 | 8/2002 | Tambakis | |
| 7,690,167 B2 | 4/2010 | Antonic | |
| 7,694,483 B1 | 4/2010 | Tucker | |
| 7,856,778 B2 | 12/2010 | Pantelides et al. | |
| 7,926,241 B2 | 4/2011 | Schiffmann et al. | |
| 7,980,033 B1 | 7/2011 | Fyfe | |
| 7,992,352 B2 | 8/2011 | Bonds et al. | |
| 8,123,142 B2 * | 2/2012 | Cislo | F24F 11/0001 |
| | | | 454/258 |
| 8,152,608 B1 * | 4/2012 | Hamby | F24F 5/0075 |
| | | | 454/251 |
| 8,266,867 B2 | 9/2012 | Schiffmann et al. | |
| 8,534,028 B2 | 9/2013 | Wojtusik et al. | |
| 8,601,763 B2 | 12/2013 | Bui | |
| 8,696,048 B2 | 4/2014 | Griffin et al. | |
| 8,776,780 B2 * | 7/2014 | Roseberry | F24D 3/005 |
| | | | 454/366 |
| 8,826,620 B2 * | 9/2014 | Krause | E04F 13/12 |
| | | | 52/489.1 |
| 9,493,938 B2 | 11/2016 | Schiffmann et al. | |
| 10,088,201 B2 * | 10/2018 | Stephan | F24S 25/70 |
| 10,138,632 B2 | 11/2018 | Mirmiran et al. | |
| 10,630,229 B2 * | 4/2020 | Stapleton | F24S 25/61 |
| 10,641,514 B2 * | 5/2020 | Hieke | F24F 11/77 |
| 11,175,056 B1 * | 11/2021 | Stevenson | F24F 11/74 |
| 11,299,886 B2 | 4/2022 | El-Domiaty et al. | |
| 2005/0076805 A1 | 4/2005 | Creighton et al. | |
| 2006/0254167 A1 | 11/2006 | Antonic | |
| 2007/0094992 A1 | 5/2007 | Antonic | |
| 2007/0197158 A1 * | 8/2007 | Byczynski | F24F 11/0001 |
| | | | 454/339 |
| 2007/0216197 A1 | 9/2007 | Wuerfel | |
| 2008/0127584 A1 | 5/2008 | Schiffmann et al. | |
| 2011/0204611 A1 | 8/2011 | Ziegler et al. | |
| 2014/0290718 A1 * | 10/2014 | Jackson, Jr. | F24S 25/11 |
| | | | 136/251 |
| 2014/0338273 A1 * | 11/2014 | Stapleton | F24S 25/65 |
| | | | 52/173.3 |
| 2015/0068587 A1 * | 3/2015 | Lomasney | H02S 30/10 |
| | | | 136/251 |
| 2015/0285524 A1 * | 10/2015 | Saunders | F24F 11/62 |
| | | | 454/239 |
| 2016/0241007 A1 | 8/2016 | Tremaine et al. | |
| 2016/0340904 A1 | 11/2016 | Mirmiran et al. | |
| 2017/0059187 A1 * | 3/2017 | Smith, Jr. | F24D 19/109 |
| 2017/0138044 A1 | 5/2017 | Malakauskas et al. | |
| 2017/0241134 A1 | 8/2017 | McCloud et al. | |
| 2018/0367090 A1 * | 12/2018 | Ayers | F24S 25/636 |
| 2018/0367093 A1 * | 12/2018 | Ayers | F24S 25/61 |
| 2019/0283372 A1 | 9/2019 | Zhao et al. | |
| 2019/0301154 A1 | 10/2019 | McCloud et al. | |
| 2020/0010121 A1 | 1/2020 | Swayne et al. | |
| 2020/0240097 A1 | 7/2020 | Rosemont | |
| 2020/0266757 A1 * | 8/2020 | Goldberg | H02S 20/24 |
| 2021/0087694 A1 | 3/2021 | Rack | |
| 2021/0115675 A1 | 4/2021 | Mol et al. | |
| 2021/0376787 A1 * | 12/2021 | Ryan | F24S 10/50 |
| 2021/0404174 A1 * | 12/2021 | Krause | E04F 13/0807 |

OTHER PUBLICATIONS

S. Black; "International Building Code: Meeting requirements for interior composites"; https://www.compositesworld.com/articles/international-building-code-meeting-requirements-for-interior-composites; Nov. 30, 2010.

J.P. Busel, "Fiber Reinforced Polymer (FRP) ACI Guidelines and Field Installations"; National Concrete Consortium, Apr. 25, 2018.

R. Liang and G. Hota; "Advanced Fiber Reinforced Polymer Composites for Corrosion Mitigation in Water Infrastructure"; The 4th Biennial TRB-CMTS Conference: From Sail to Satellite: Delivering Solutions for Tomorrow's Marine Transportation Systems Conference, Jun. 21-23, 2016.

J.C. Miguel et al., "Fiber Reinforced Polymer (Frp): A New Materia Used in Facades of Tall Buildings"; Global Interchanges: Resurgence of the Skyscraper City, 2015.

American Composites Manufacturers Association; "Guidelines and Recommended Practices for Fiber-Reinforced-Polymer (FRP) Architectural Products"; 2016.

S. Witt and G. Gilda; "Structural Rehabilitation"; American Composites Manufacturers Association, Structure Magazine, Mar. 2016.

Strongwell, "FRP Specifications"; Section 06 70 00, Fiberglass Reinforced Polymer (FRP); Nov. 2016.

Gangarao and Liang; "Applications of Fiber Reinforced Polymer Composites"; ICERP 2006, Chennai, India, Feb. 23-25, 2006.

PCT International Search Report, for PCT/US21/47414, our reference PI001PCT, Feb. 4, 2022.

PCT Written Opinion, for PCT/US21/47414, our reference PI001PCT, Feb. 4, 2022.

Extended European Search Report for appl. No. 21862603.4 corresponding to PCT/US2021/047414, Sep. 11, 2024.

* cited by examiner

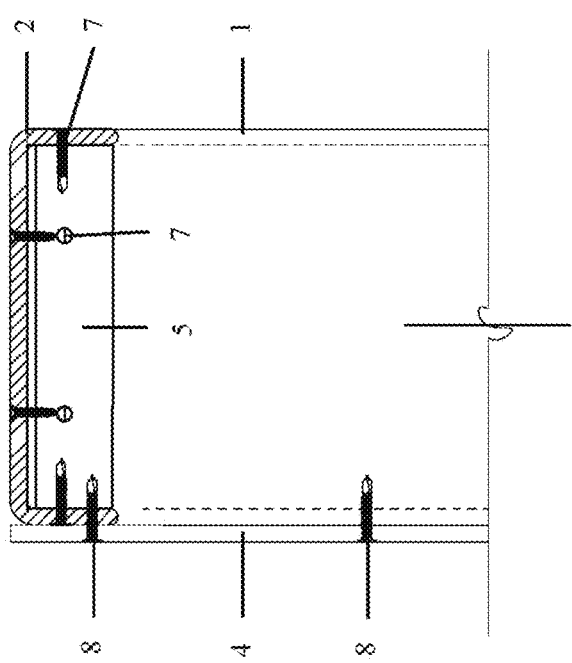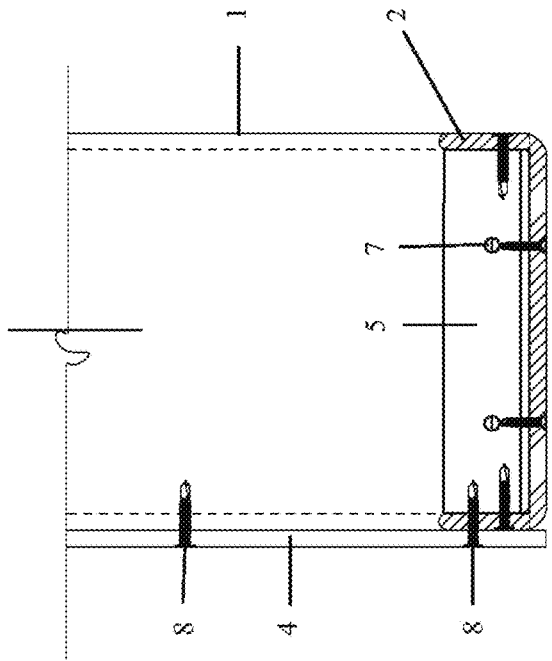
FIG. 4

FIBER REINFORCED POLYMER BUILDING SYSTEMS AND METHODS

CROSS REFERENCE TO PRIOR APPLICATIONS

This application is a Division of U.S. patent application Ser. No. 17/093,262, filed on Nov. 9, 2020, now U.S. Pat. No. 11,613,891; which claims the priority benefit of U.S. Pat. Appl. Ser. No. 63/069,972, filed on Aug. 25, 2020; each of which is expressly incorporated by reference herein in its entirety.

BACKGROUND

I. Field

Aspects of the disclosure generally relate to building systems, structures, and components; and more particularly to techniques and apparatuses for composite building systems, vehicles, structural frames, walls, floors, and roofs comprising Pultruded Fiberglass Reinforced Polymer (PFRP) material.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

PFRP can include fiberglass, which is a composite comprising a polymer resin matrix reinforced with embedded glass fibers. The strength of a fiberglass element is determined primarily by the type, orientation, quantity, and location of the glass fibers within the composite. This allows the end product to be engineered to provide specific performance characteristics, such as ballistic protection or predetermined flexibility or stiffness.

Pultrusion is a manufacturing process for producing continuous lengths of PFRP structural shapes with constant cross-sections. Raw materials can include a liquid resin mixture (containing resin, fillers and specialized additives) and flexible textile reinforcing fibers. The process involves pulling these raw materials (rather than pushing, as is the case in extrusion) through a heated steel forming die using a continuous pulling device. This technique removes all air/gasses from the product, allowing for a much stronger and safer product compared with other materials.

Pultrusion yields smooth finished parts that typically do not require post processing. A wide range of continuous, consistent, solid and hollow profiles can be pultruded, and the process can be custom-tailored to fit specific applications. Pultrusion has been used for decades with glass fiber and polyester resins, but in the last 10 years the process also has found application in advanced composites applications.

Today, the vast majority of mobile and fixed building structures and enclosures are still constructed using traditional building materials, such as steel, concrete, and wood. In order for any new building material to be certified for use, an engineering process and building method need to be identified or developed that solve the problems associated with fire, deflection, impact, and seismic effects while meeting numerous building codes and standards in varying geographical locations.

Barriers to entry for new building materials include fire protection standards, cost, and resistance by General Contractors for product training and education. Aspects disclosed herein can solve these and other problems.

SUMMARY

Disclosed aspects include composite building and mobile systems that exploit advantageous characteristics of PFRP materials and can eliminate many long-standing problems found within the construction industry. PFRPs can weigh approximately 75-80% less than steel and 30% less than aluminum. Disclosed aspects can enable in lower transportation costs, easier installation, and less weight in structural designs; requiring less equipment, fewer workers, and less time to install. Additionally, PFRP's can be field-fabricated with standard carpentry tools (using carbide or diamond blades). This can greatly reduce building costs, installation time, equipment, and labor costs. PFRPs are corrosion-resistant, will not rot, and can withstand weathering and intense use. It is impervious to insects and a broad range of corrosive environments. Maintenance costs, such as routine painting, repair, or replacement, can be reduced or eliminated. PFRPs have low thermal conductivity, are electrically non-conductive (making the material an excellent insulator) and transparent to radio waves, microwaves, and other electromagnetic frequencies.

In one aspect, a composite building system comprising a structural frame, walls, floor and or a roof made of PFRP material can be used to construct mobile and fixed building structures, enclosures, or vehicles. Disclosed aspects can be developed for residential, commercial, industrial, healthcare, aerospace, government defense, energy, and agriculture sectors, as well as other markets. PERP can resist impact damage from winds in excess of 250 miles per hour, and deteriorates slowly compared to traditional building materials, such as steel, concrete, and wood. PFRP enables minimal transfer of thermal energy and can be designed to provide variable strength for ballistic and seismic protection. Disclosed aspects can provide for reduced weight, labor costs, construction time, and total cost of ownership over the life of the structure.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain aspect herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

BRIEF DESCRIPTION OF THE DRAWINGS

The disclosed aspects will hereinafter be described in conjunction with the appended drawings, provided to illus FIG. 4 is a schematic representation of the components and function of a PFRP wall frame assembly

DETAILED DESCRIPTION

Figure 1:
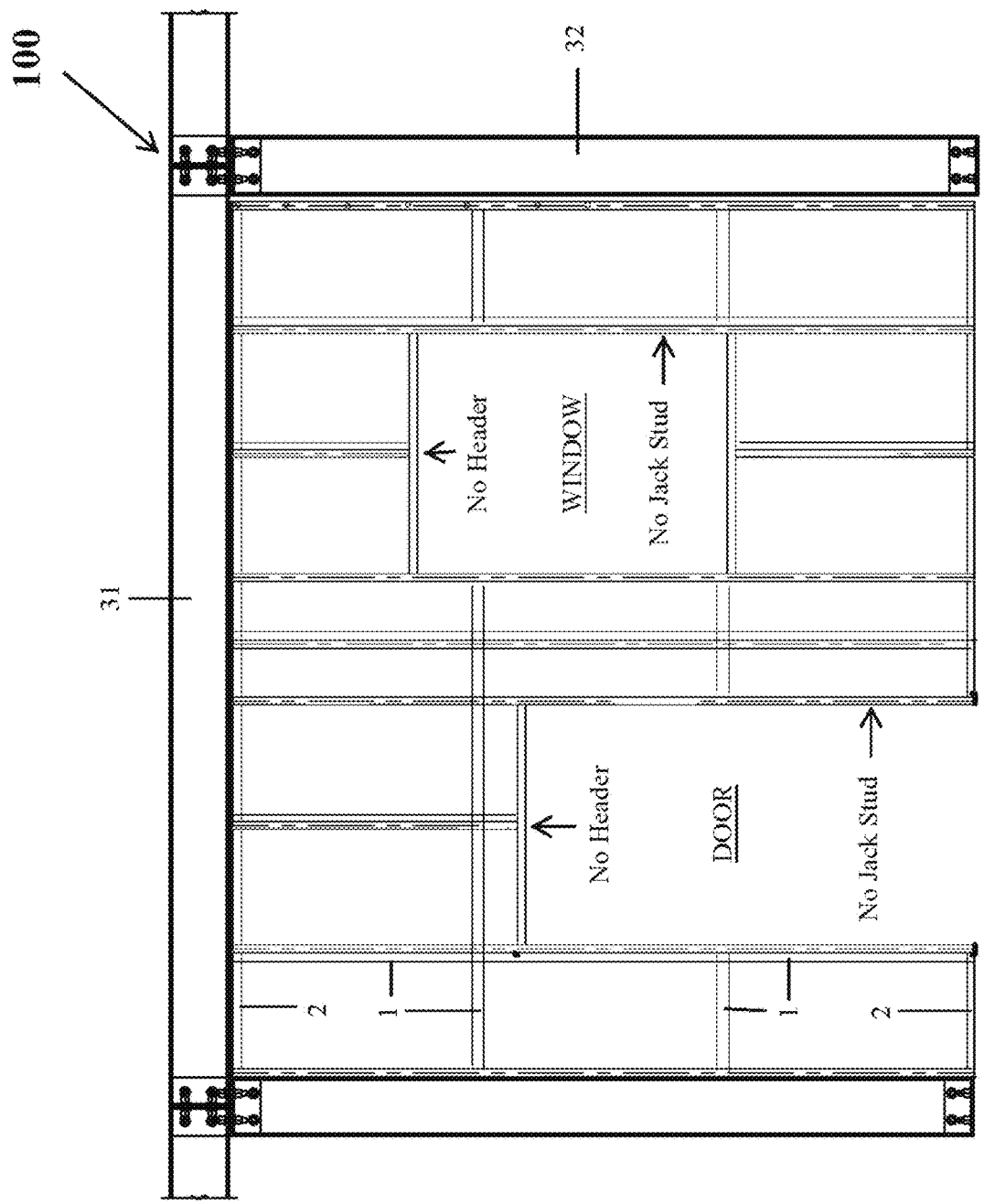
- FIG. 1 is a schematic representation of a PFRP non-load bearing wall frame assembly

The description that follows includes exemplary systems, methods, and techniques that embody techniques of this disclosure. However, it is understood that the described aspects may be practiced without these specific details. Apparatuses and methods are described in the following description and illustrated in the accompanying drawings by various blocks, modules, components, steps, parts, processes, etc. (collectively referred to as "elements").

PART NUMBERS

1—PFRP "C" channel vertical and horizontal stud
2—PFRP "C" channel head or sill track
3—PFRP hold down bracket
4—PFRP ballistic or non-ballistic sheeting
5—PFRP clip angle bracket "A"
6—PFRP clip angle bracket "B"
7—Stainless steel self-drilling screw (small)
8—Stainless steel self-drilling screw (medium)
9—Stainless steel self-drilling screw (large)
10—Traditional sealant system such as caulk
11—PFRP flat tip embed connector
12—PFRP pointed tip embed connector
13—PFRP frame assembly
14—Thermal air gap
15—Architectural precast concrete cladding
16—PFRP variable connector nut
17—PFRP fix nut
18—Traditional insulation layer
19—PFRP threaded shaft
20—PFRP pitch roof
21—PFRP roof deck
22—PFRP wall assembly
23—Traditional bolt
24—PFRP C channel, I-beam, wide flange beam, joists
25—PFRP floor assembly
26—PFRP floor deck
27—Concrete footer
29—PFRP flange
30—PFRP piling
31—PFRP I-beam or wide flange beam used horizontally as a structural beam
32—PFRP I-beam or wide flange beam used vertically as a structural column
33—PFRP "Z"-Bracket
34—PFRP solar mounting bracket
35—PFRP "C" Channel Truss
100—PFRP wall frame assembly.
200—PFRP embed connectors.
300—PFRP roof assembly.
400—PFRP floor assembly.
500—PFRP single or multi-story building system attached to concrete footer.
600—PFRP single or multi-story building system attached to a PFRP piling with PFRP flange.
700—PFRP I-beam or wide flange structural frame assembly.
800—PFRP solar roof tile and solar roof panel assembly.
900—PFRP truss roof or floor assembly.

Glossary

As used herein and in the claims, each of the terms defined in this glossary is understood to have the meaning set forth in this glossary. As such, claims should first be construed based on intrinsic evidence. If a claim term remains ambiguous after considering the intrinsic evidence, then extrinsic evidence is to be considered.

Architectural Precast Concrete Cladding—Precast concrete cladding offers a cost-effective means of providing a robust, high-quality facade, with a great variety of durable textures, colors and patterns, including a range of facing materials such as stone and brick.

Ballistic—is the field of mechanics concerned with the launching, flight behavior and impact effects of projectiles, especially ranged weapon munitions such as bullets.

Composite Material—is a material made from two or more constituent materials with significantly different physical or chemical properties that, when combined, produce a material with characteristics different from the individual components.

Deteriorate—to make or become worse or inferior in character, quality, value; to disintegrate or wear away.

Embed—to fix into a surrounding mass; to surround tightly or firmly; envelop or enclose; to incorporate or contain as an essential part or characteristic.

Fiberglass—is a common type of fiber-reinforced plastic using glass fiber. The fibers may be randomly arranged, flattened into a sheet, or woven into a fabric. The plastic matrix may be a thermoset polymer matrix—most often based on thermosetting polymers such as epoxy, polyester resin, or vinyl ester—or a thermoplastic.

Fiber Reinforced Polymer (FRP)—most often referred to as "fiberglass". Used in this context, "fiberglass" is a composite consisting of a polymer resin matrix reinforced by embedded glass fibers.

PFRP—a continuous molding process using material consisting of strong fibers embedded in a resin matrix. The most common fibers are glass, carbon, and synthetic fibers which are formed using a pultrusion method which eliminates out-gassing while providing a method to strengthen the product.

Intumescent—is a substance that swells as a result of heat exposure, thus leading to an increase in volume and decrease in density. Intumescents are typically used in passive fire protection and require listing, approval and compliance in their installed configurations in order to comply with the national building codes and laws.

Outgassing—is the release of a gas that was dissolved, trapped, frozen, or absorbed in some material. Outgassing can include sublimation and evaporation, as well as desorption, seepage from cracks or internal volumes, and gaseous products of slow chemical reactions.

Polymer—is a substance or material consisting of very large molecules, or macromolecules, composed of many repeating subunits. Polymer can be both synthetic and natural.

Pultrusion—is a continuous process for manufacture of composite materials with constant cross-section. The term is a portmanteau word, combining "pull" and "extrusion". As opposed to extrusion, which pushes the material, pultrusion works by pulling the material.

Resin—is a generic term used to designate the polymer, polymer precursor material, and/or mixture or formulation thereof with various additives or chemically reactive components.

Seismic—pertaining to, of the nature of, or caused by an earthquake or vibration of the earth, whether due to natural or artificial causes.

Thermal Air Gap—Deliberate spacing between the PFRP frame assembly and the exterior architectural concrete cladding to stop the thermal transfer between the two components.

DETAILED DESCRIPTION

Figure 2:
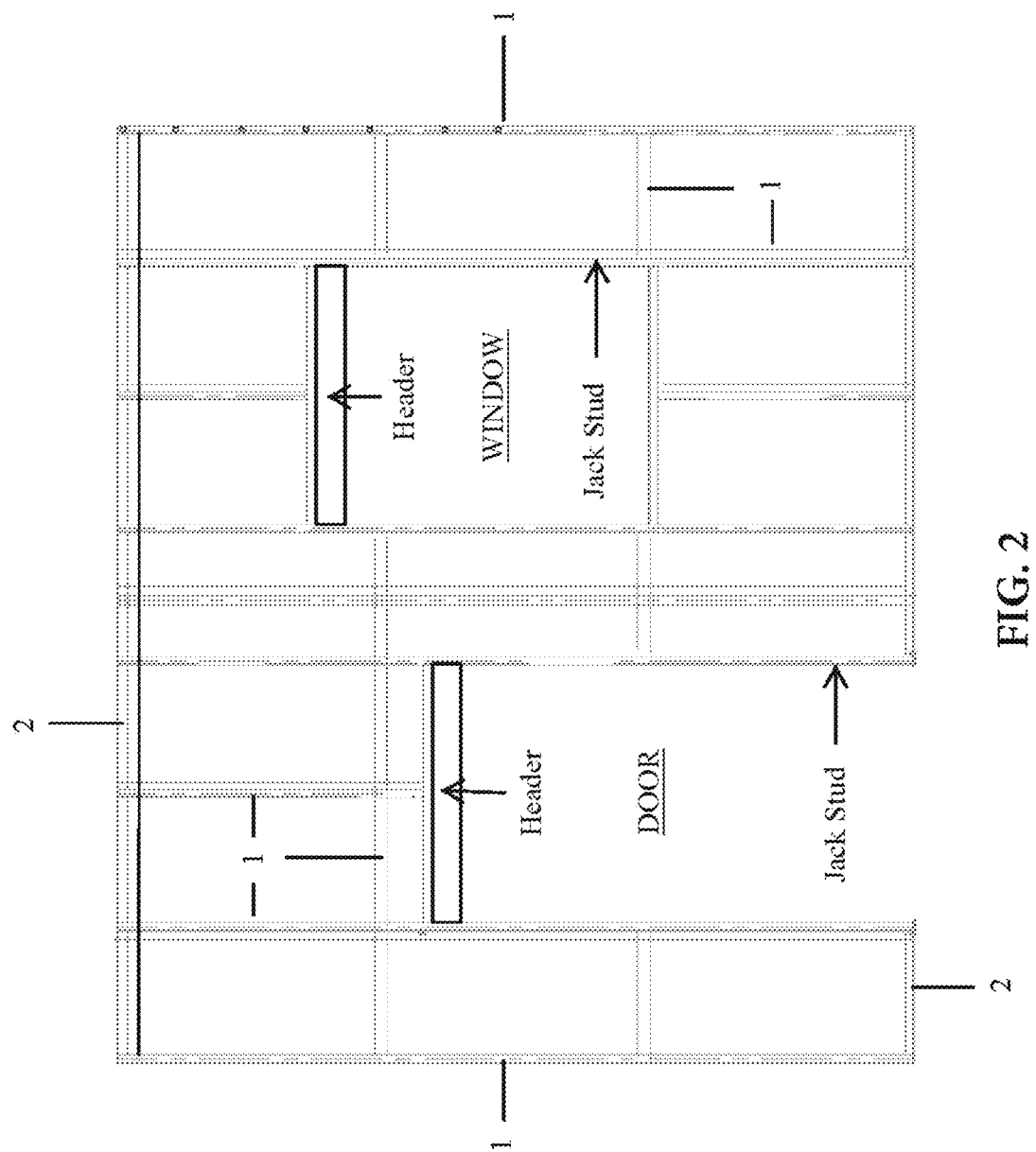
FIG. 2 is a schematic representation of a PFRP load bearing wall frame assembly
Figure 6:
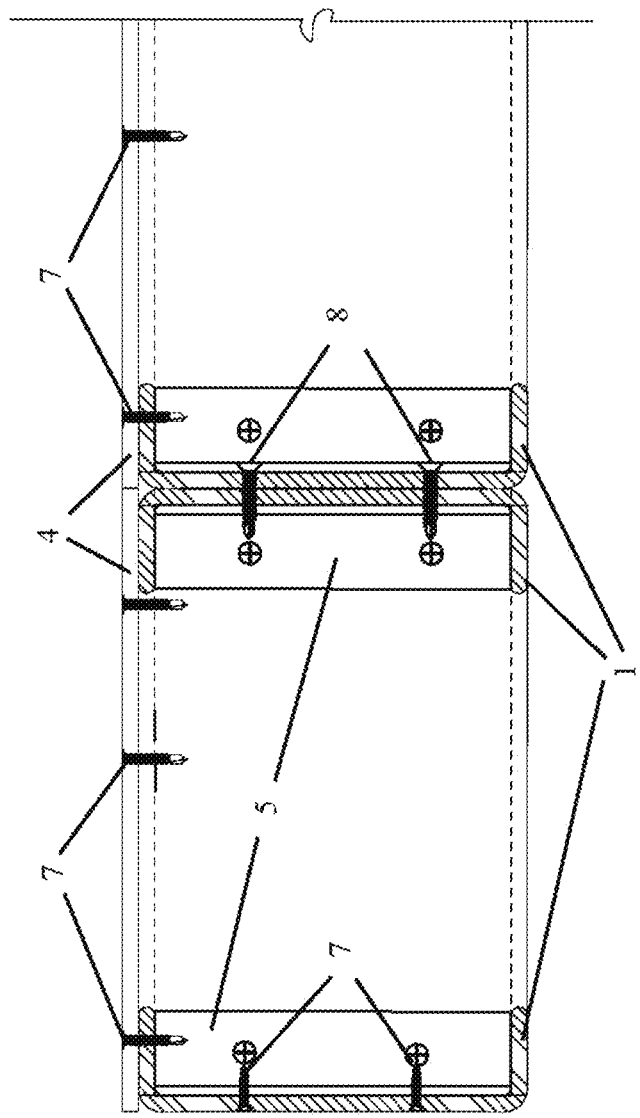
FIG. 6 is a schematic representation of the components and function of a PFRP double vertical "C" channel stud connected to PFRP horizontal "C" channel stud or PFRP "C" channel head or sill track
Figure 7:
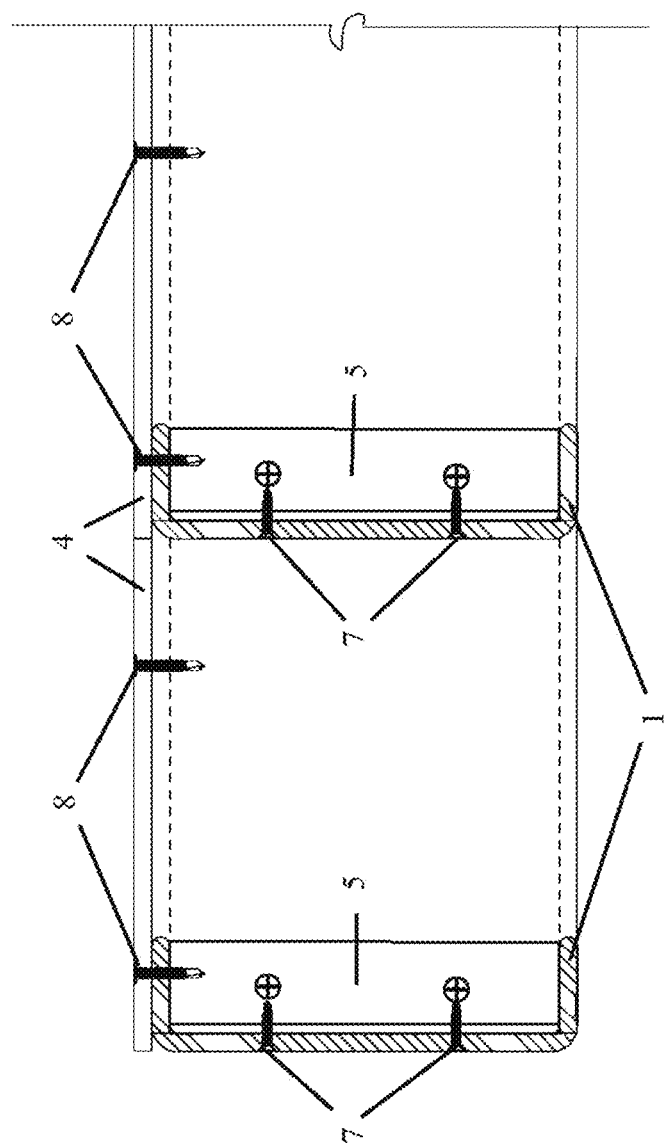
FIG. 7 is a schematic representation of the components and function of a PFRP single vertical "C" channel stud connected to horizontal "C" channel stud or PFRP "C" channel head or sill track at the end of an PFRP wall frame assembly
Figure 10:
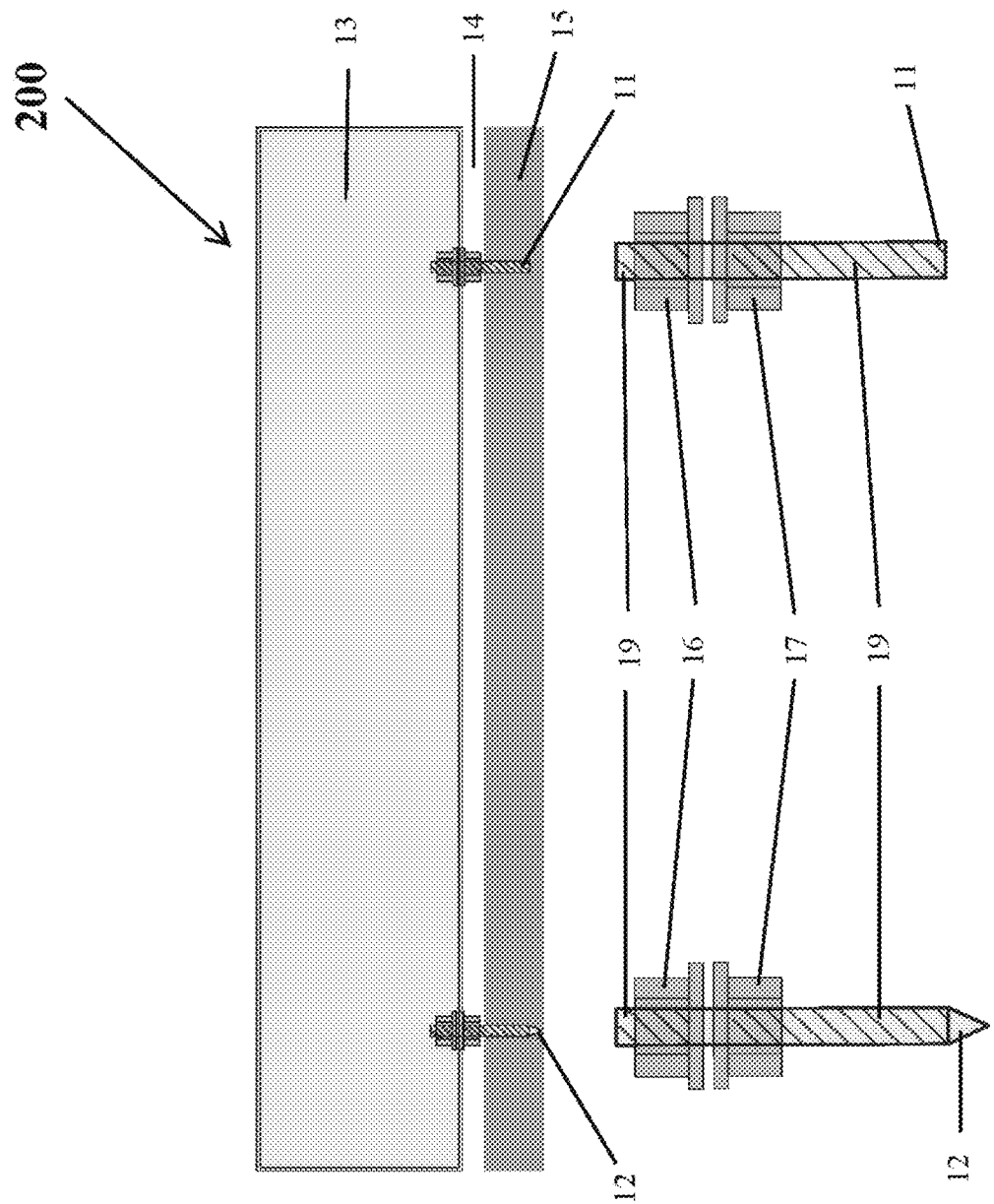
FIG. 10 is a schematic representation of the components and function of a PFRP flat tip and pointed tip embed connector to connect an exterior architecture concrete cladding to a PFRP wall frame assembly
Figure 11:
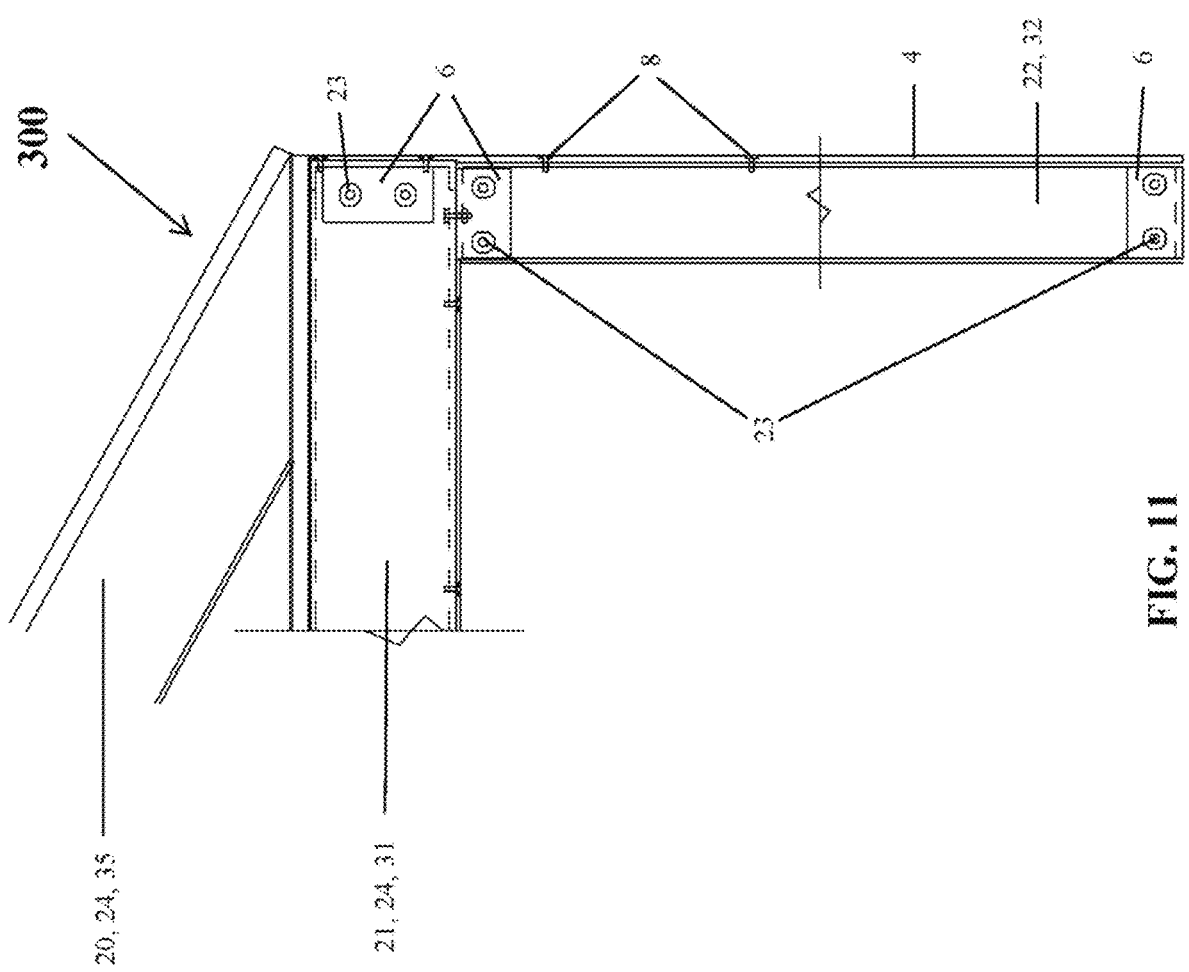
FIG. 11 is a schematic representation of the components and function of PFRP roof types (flat 21 and pitched 20), and PFRP C channel, I-beam, wide flange beam, and joists 24 to a PFRP wall frame assembly
Figure 13:
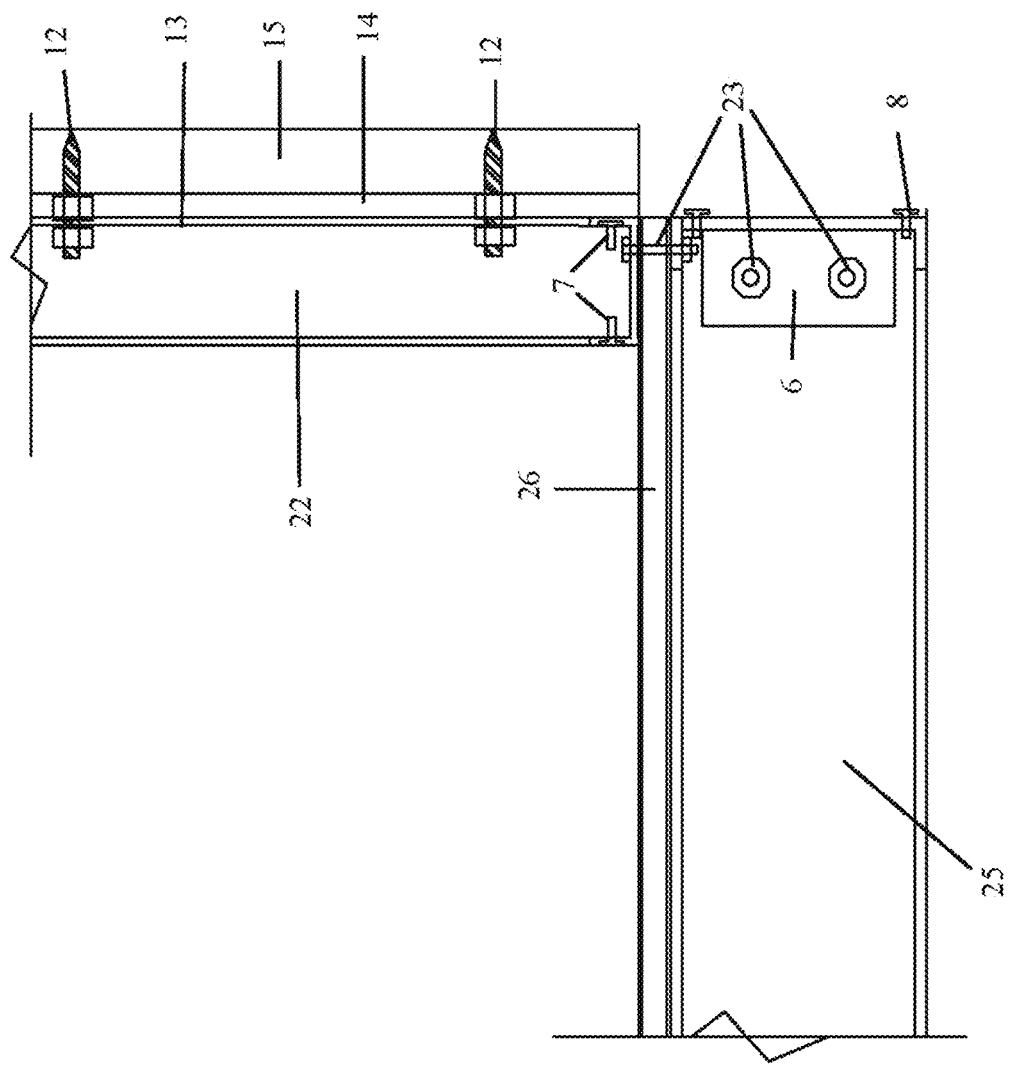
FIG. 13 is a schematic representation of the components and function of a PFRP frame assembly with an exterior architectural concrete cladding to a PFRP floor assembly
Figure 14:
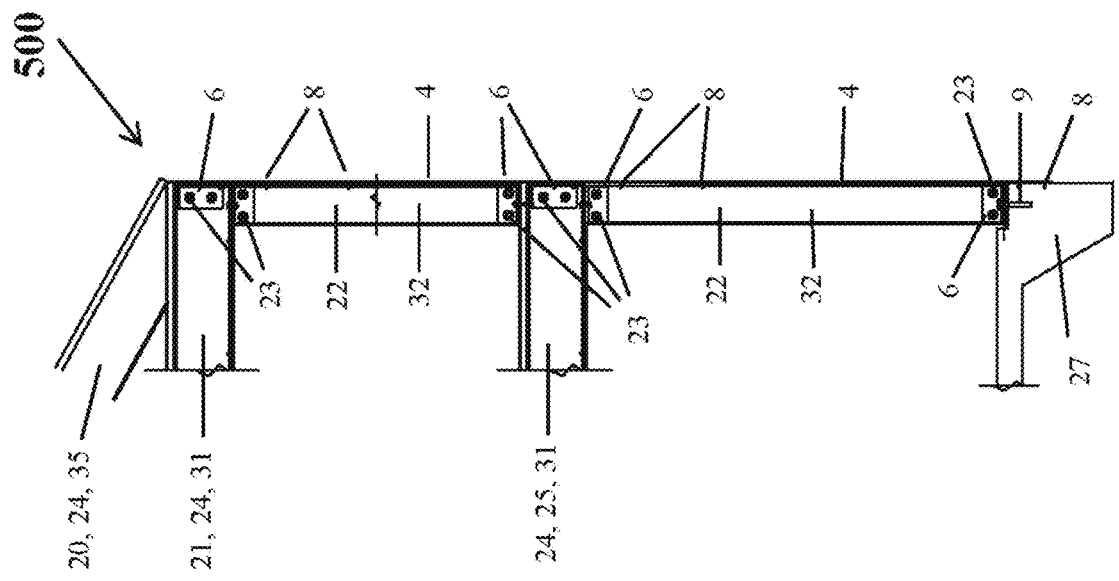
FIG. 14 is a schematic representation of the components and function of a PFRP roof, wall and floor assembly for a multi-story structure connected to a traditional concrete footing
Figure 16:
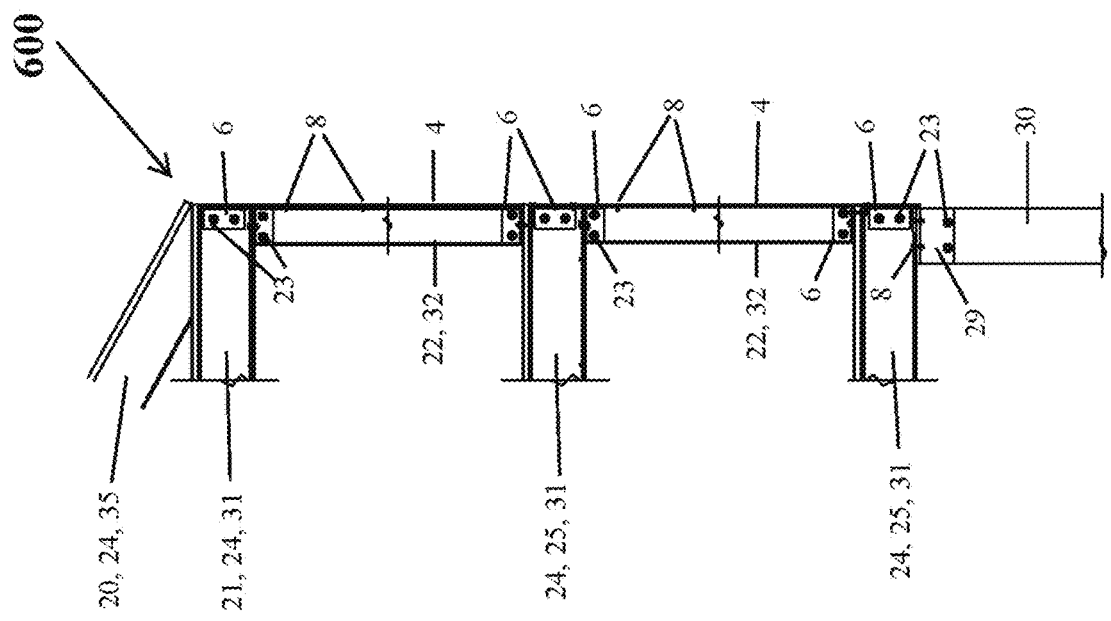
FIG. 16 is a schematic representation of the components and function of a PFRP roof, wall and floor assembly for a multi-story structure connected to a PFRP piling with a PFRP flange

The PFRP frame assembly (comprising PFRP "C" channel vertical and horizontal studs 1 and PFRP "C" channel head or sill tracks 2) of system 100, FIG. 1 and FIG. 2, allows the PFRP wall assembly, 22, FIG. 4, of system 300, FIG. 11 of system 300, FIG. 14 of system 500, and FIG. 16 of system 600, to be used in a multi-story or single-story structure as a non-load bearing wall or an architectural precast concrete cladding panel, 15 of system 200, FIG. 10, and system 400, FIG. 13. This eliminates the need for a traditional header and Jack-stud at window and door locations, FIG. 2. The PFRP frame assembly, system 100, is made up of single stud and double studs, FIGS. 6 and 7, which prevents the deflection to meet the building code requirements. It is a fully composite system which prevents corrosion and is resistant to mold, termites, water, and chemicals. It also provides an insulated frame assembly that does not allow thermal bridging as commonly found in metal studs, thus, provides high energy efficiency and eliminates noise vibration which is also commonly found in metal framing. The "C" channel shape of the studs, 1, FIG. 3, allows for more surface area to install insulation compared with using wood studs. Another advantage of the PFRP frame assembly, system 100, compared to traditional wood or metal framing is the lighter weight which reduces the structural requirements of the foundations, building structure, required erection equipment and labor. All of these benefits reduce the overall cost of construction and maintenance cost over the lifetime of the structure.

The PFRP frame assembly is versatile and can be used as a load-bearing wall, FIG. 2, system 100, by adding a PFRP header and a PFRP Jack-stud at window and door locations. Using a PFRP load bearing wall assembly, FIG. 2, will reduce the foundation requirements on interior load bearing walls compared to traditional wood, steel, or concrete load bearing walls because of the weight reduction of the PFRP wall.

Traditional construction materials are subject to failure in the following areas: concrete cracks due to its rigidity; steel can bend, rust or deforms due to external forces from seismic activity, high velocity winds or intrusion of moisture or water; wood can rot, crack or be destroyed by insects. A PFRP frame assembly, system 100, is resistant to all the failures known to traditional construction materials. The PFRP frame assembly, system 100, FIGS. 1 and 2, using PFRP framing components, FIG. 4, allows for a unified construction of the wall which eliminates differentials in expanding and contracting as commonly found in traditional building materials. The PFRP advantage eliminates moisture, cracking, and delamination of layers of material. The breakdown of traditional materials is conducive to ambient air and water intrusion, further compromising the structure of the conventional building wall.

Describing further the versatility of the PFRP framing assembly, system 100, is the ability to attach a PFRP non-ballistic sheeting, 4, PFRP ballistic sheeting, 4, FIG. 4, architectural precast concrete cladding panel, 15, or a tilt-wall concrete panel via a PFRP embed connector 11, 12, FIG. 10 of system 200 and FIG. 13 of system 400. The PFRP non-ballistic sheeting, 4, is constructed with standard pultrusion process whereas the PFRP ballistic sheeting, 4, is constructed using multi-directional glass fiber using a pultrusion process. The PFRP ballistic sheeting, 4, FIG. 4, is designed to withstand high-velocity projectile impact by delaminating, thus, absorbing the energy associated with a high-velocity projectile. The PFRP sheeting, 4, FIG. 4, can be manufactured in varying thicknesses to provide a wide range of high-velocity projectile protection. This feature allows for its use in construction to protect persons or property within the structure from tornado or hurricane winds or small-arm and rifle munitions.

Most traditional PFRP products are made with a fire-retardant chemical contained within the resin. This process uses smoke produced by the fire-retardant chemical to extinguish the flame. This smoke is toxic and does not meet building fire code requirements for occupied structures. The advantage of the present invention is that the PFRP wall sheeting, 4, FIG. 4, or PFRP wall assembly, 22, FIG. 4, of system 100, does not contain the fire-retardant chemical. The present invention relating to the PFRP wall sheeting, 4, or PFRP framing assembly, system 100, uses an applied intumescent fire-resistant coating which is applied to the PFRP wall sheeting, 4, or PFRP wall assembly, 22, during the manufacturing process and prior to any finish coat or completion of a traditional interior or exterior finishing system. Under the present invention method, the lack of toxic smoke and inability for the flame to crawl or grow larger, also known as flame spread, permits the present invention to pass building fire code and requirements for occupied structures.

The PFRP frame assembly, 13, FIG. 10 of system 200 and 22, FIG. 13 of system 400, can be shipped to the job site or a precast concrete manufacturing facility and a concrete cladding panel, 15, FIG. 10, and FIG. 13 can be poured into the PFRP frame assembly. Once the concrete cures, the PFRP wall assembly, 22 and 15, FIG. 13 of system 400, can then be shipped to the job site and lifted into position as a precast cladding system or tilted into position like a traditional tilt-up wall panel. The present invention uses an PFRP embed connector, 11 and 12 of system 200, FIG. 10 and system 400, FIG. 13, to connect the PFRP frame, 13, FIG. 10 to the concrete panel, 15, FIGS. 10 and 13. The PFRP embed connector, 11, 12, comprises a PFRP threaded shaft 19 and is designed with a pointed tip, 12, and a fixed nut, 17, with variable nut, 16, FIG. 10, to hold the PFRP frame assembly, 13, FIG. 10 off of the casting surface at the precise height to ensure alignment of the concrete face panel, exterior surface, and the alignment of the PFRP frame assembly, 13 FIG. 10, for the interior surface of the tilt-wall or precast cladding, 15, FIGS. 10 and 13. The PFRP embed connector is also designed with a flat tip, 11, with fixed and variable nuts, 16, 17, FIG. 10. The PFRP embed flat tip connector 11, is used when an architectural reveal is designed into the concrete form. The PFRP flat tip embed connector, 11, allows the difference in concrete thickness to form an exterior design, thus, the PFRP flat tip embed connector, 11, provides the interior concrete spacing between the PFRP frame, 13, FIG. 10, and architectural reveal, 15, FIGS. 10 and 13 to accommodate the changing concrete thickness. The PFRP embed connector, both pointed tip and flat tip, 11, 12, provides connection of the PFRP frame assembly, 13 FIG. 10, to the concrete cladding, 15, FIGS. 10 and 13. This connection is made possible by a fixed nut, 17, FIG. 10, that attaches to the PFRP embed connector shaft, 11, 12, FIG. 10. The fixed nut, 17, creates a thermal air gap, 14, FIGS. 10 and 13, between the face of the PFRP frame assembly, 13 FIG. 10, and the rear side of the concrete precast cladding, 15, FIG. 10. This intentionally designed air gap, 14, FIG. 10, system 200 and FIG. 13, system 400 with PFRP embed connectors 11 and 12, eliminates the thermal transfer between the PFRP frame assembly, 13, FIG. 10, and the architectural precast concrete cladding, 15, FIG. 10 or tilt wall. The PFRP embed connector, 11, 12, uses the PFRP fixed nut, 17, FIG. 10, to hold the PFRP frame assembly, 13 FIG. 10, off the casting surface at the precise height and the PFRP variable nut, 16, connects the PFRP embed connector, 11, 12, to the PFRP frame assembly, 13, FIG. 10. The PFRP embed connectors, 11 and 12 of System 200, FIG. 10, and FIG. 13, system 400, eliminates the thermal transfer between the PFRP frame assembly, 13, FIG. 10, and the architectural precast concrete cladding panel, 15, FIG. 10, system 200.

Figure 3:
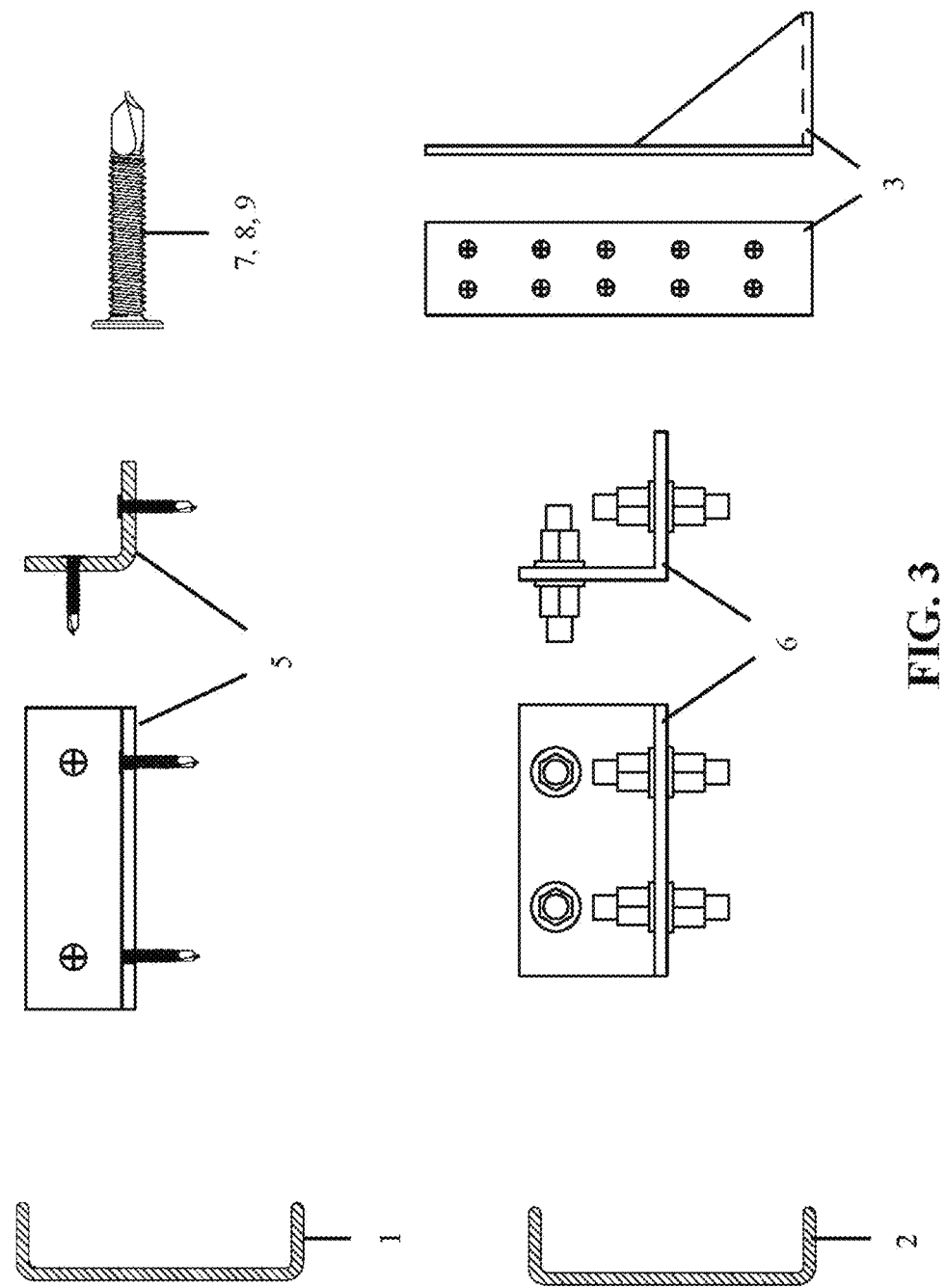
FIG. 3 is a schematic representation of the components of a PFRP wall frame assembly
Figure 5:
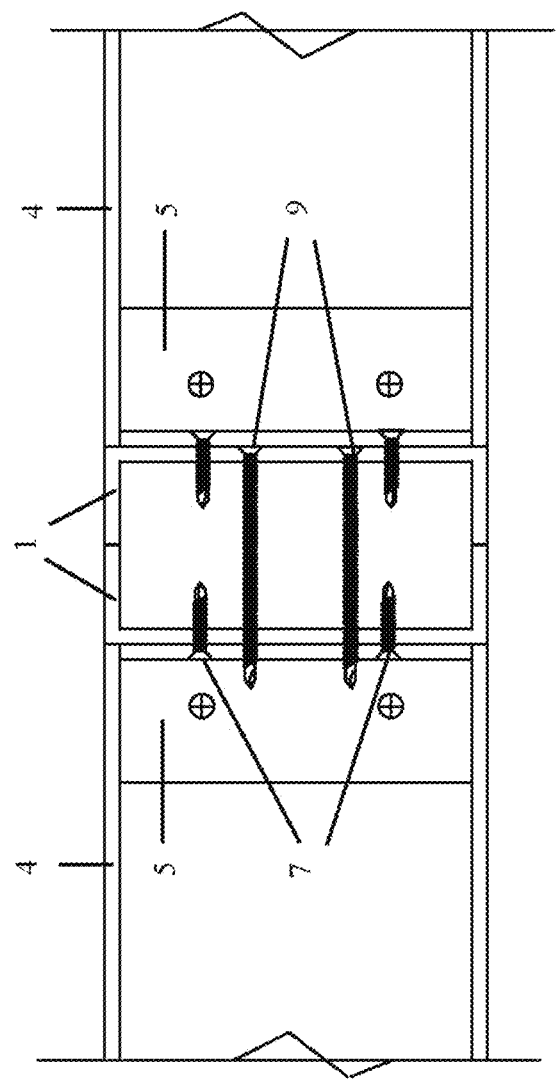
FIG. 5 is a schematic representation of the components and function of a PFRP double vertical "C" channel stud connected to PFRP horizontal "C" channel stud or PFRP "C" channel head or sill track at a window or door opening
Figure 15:
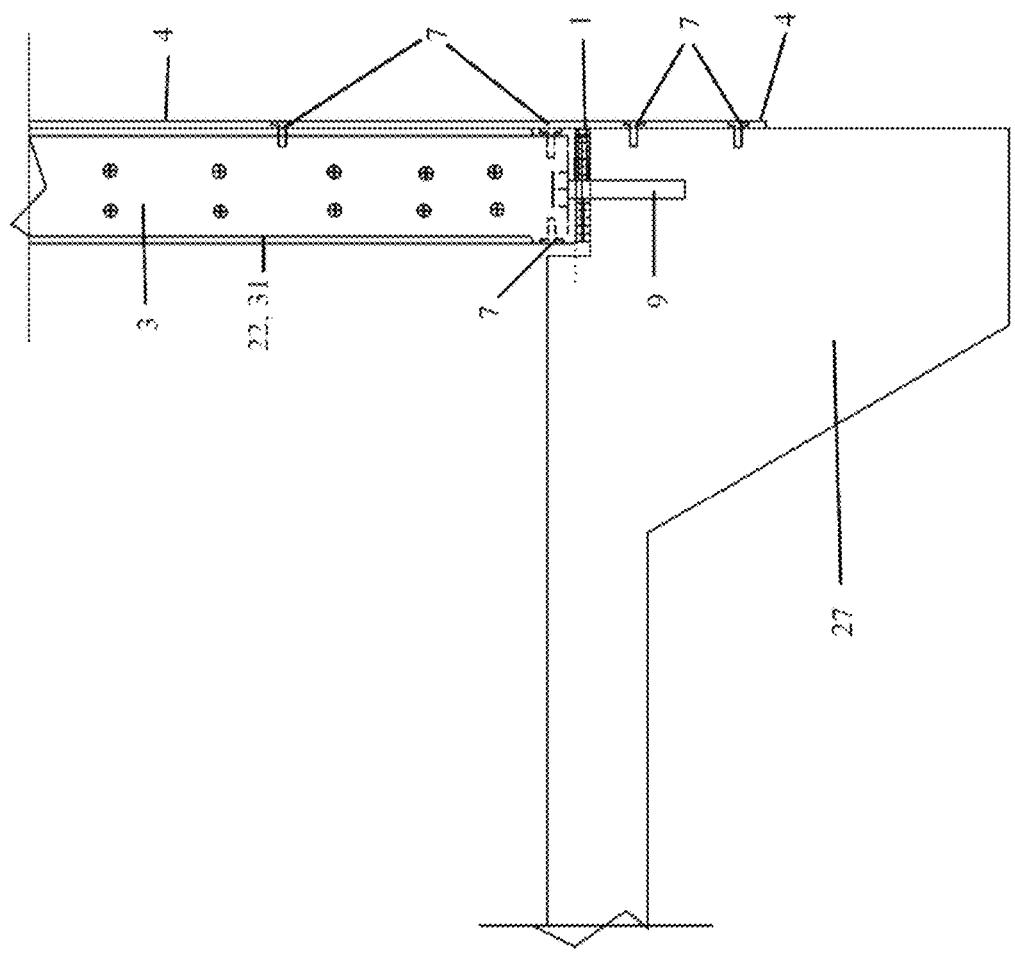
FIG. 15 is a schematic representation of the components and function of a PFRP wall assembly connected to a traditional concrete footing
Figure 19:
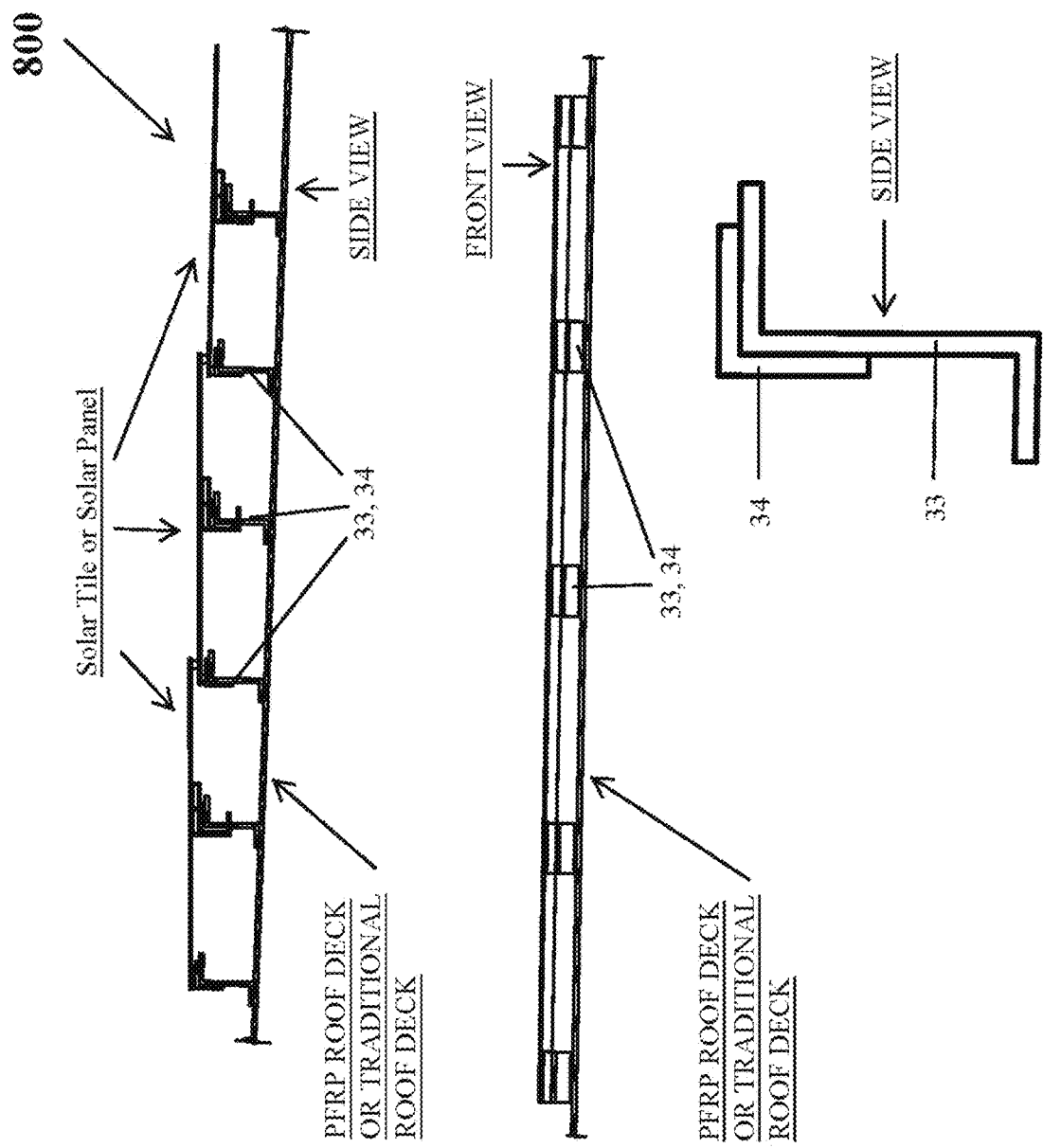
FIG. 19 is a schematic representation of the components and function of a solar roof tile and solar roof panel with a PFRP mounting bracket and PFRP "Z" bracket connected to a PFRP roof deck or traditional roof deck assembly, side view
Figure 20:
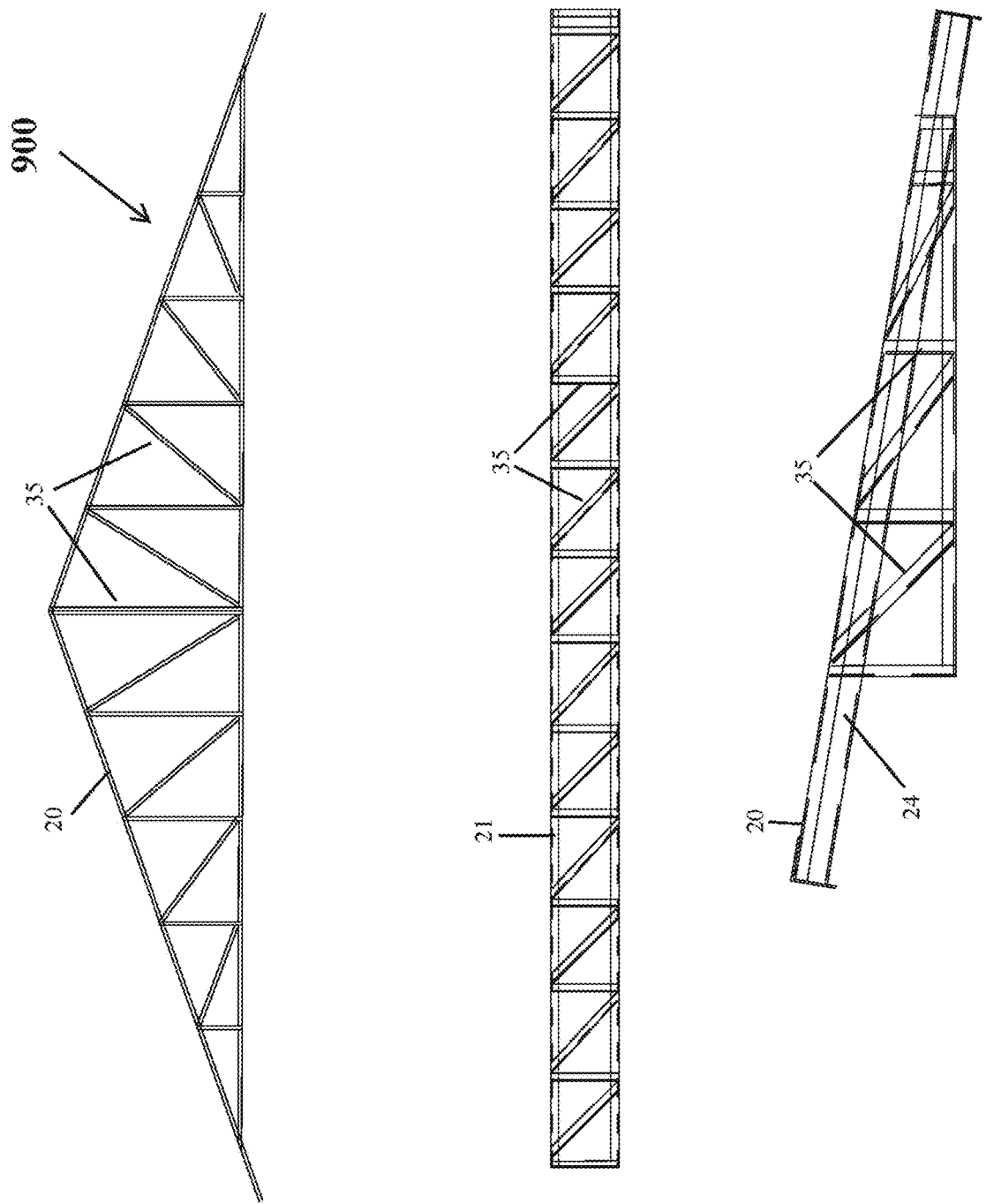
FIG. 20 is a schematic representation of the components and function of a PFRP truss roof assembly comprising PFRP "C" Channel Trusses 35 on a PFRP pitch roof 20 or PFRP roof deck 21 or a traditional pitch roof or flat roof

The PFRP frame assembly, FIG. 1 of system 100, contains a PFRP vertical column, 32, and horizontal PFRP I-beam, 31, or wide flange horizontal beam, 31, which connects to a PFRP roof assembly, system 300, FIG. 11, by using a PFRP clip angle bracket, 5 of FIG. 3 and FIG. 11. The PFRP column, 32, and the PFRP beam, 31, provides the structural support of the PFRP roof assembly, system 300, FIG. 11, and transfers the PFRP roof load to the traditional concrete foundation, 27 of FIG. 14 and system 500, or PFRP piling, 30, FIG. 16 of system 600. The PFRP non-ballistic or ballistic sheeting, 4, overlaps the PFRP column, 32, and PFRP roof assembly, system 300 of FIG. 11 to provide continuous coverage on the exterior side of the structure to prevent water and air intrusion, FIGS. 14 and 15. The PFRP roof assembly, system 300 of FIG. 11, uses the PFRP structural frame, system 700 of FIG. 18, to support a PFRP roof deck, 21 of system 300, FIG. 11. The PFRP roof assembly, system 300 of FIG. 11, can be either a PFRP flat roof deck, 21, or [an] a PFRP pitched roof, 20. Either PFRP roof assembly, system 300, can support a solar panel or solar roof tile, system 800 of FIG. 19, using the PFRP "Z"-brackets 33 and PFRP solar mounting brackets 34 of FIG. 19. FIG. 19 illustrates PFRP solar mounting brackets 34 connected to the solar panel or solar tile, and configured, by the PFRP "Z"-brackets 33, to mount the solar panel or solar tile on a roof, wherein the PFRP "Z" brackets elevate the solar panel or solar tile a sufficient amount above the roof to enable airflow to occur under the solar panel or solar tile. The advantage of using the PFRP "Z"-bracket 33 and PFRP solar mounting bracket, 34, is that it elevates the solar roof panel or the solar roof tile off of roof, FIG. 20, thus, allowing ambient air flow to occur under the solar panel or tile. This intentional method of design reduces the thermal loading of the solar panel or solar roof tile, system 800, and increases the solar power generation efficiency approximately 35%. In addition, the ambient air that flows under the solar panel or the solar roof tile can be directed into the ridge vent and then travels down a duct to the ventilation system and can be used to pre-heat the air as a heating source.

Figure 12:
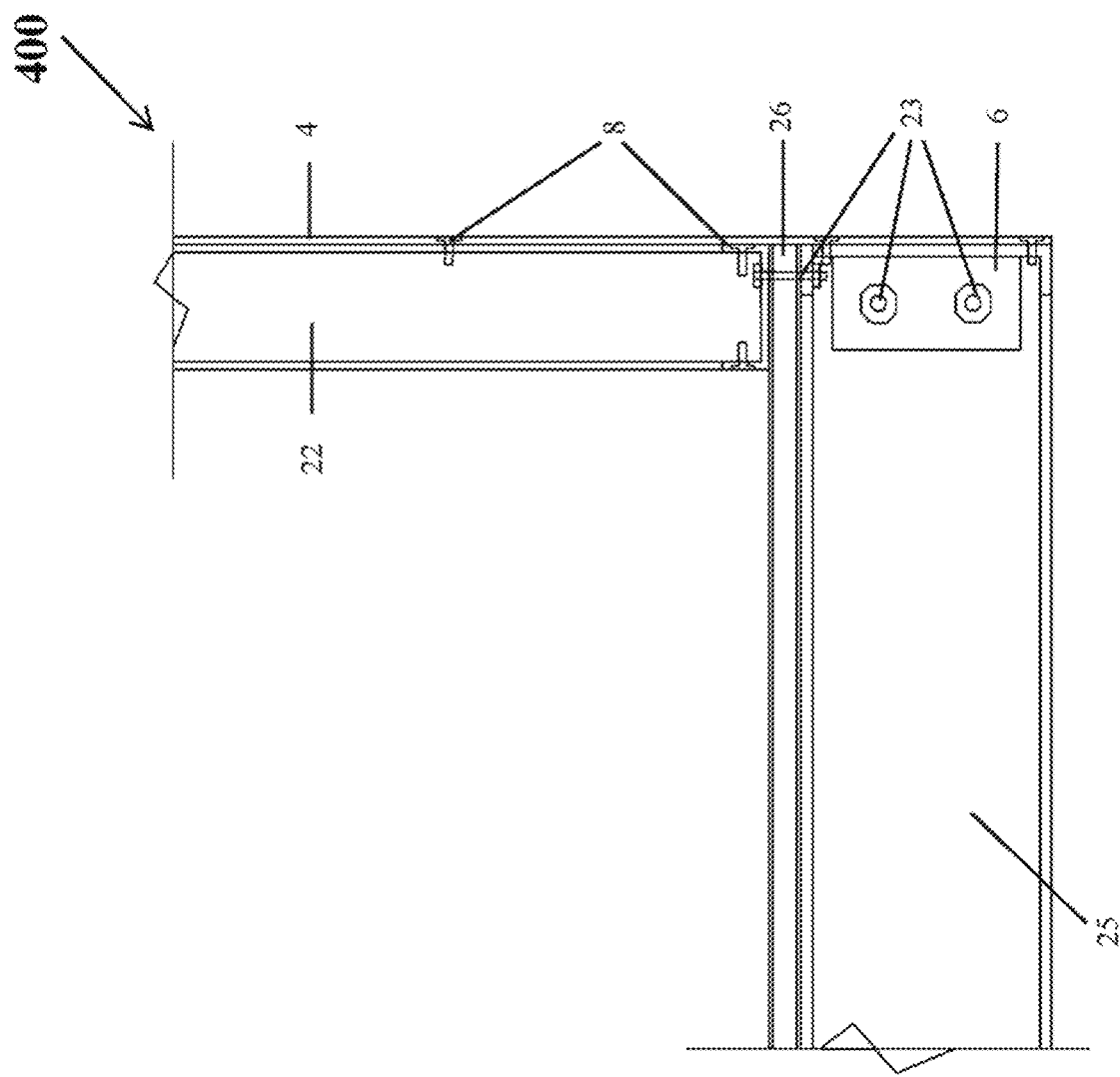
FIG. 12 is a schematic representation of the components and function of a PFRP wall assembly connection to a PFRP floor assembly

The PFRP frame assembly, FIG. 1, system 100, contains an PFRP column, 32, which connects to a PFRP floor assembly, 25 of FIG. 12, by using a PFRP clip angle bracket, 6, FIG. 3. The PFRP column, 32, provides the structural support of the roof transferring the roof load to the PFRP horizontal beam, 31, and PFRP column, 32, to the concrete foundation, 27, or PFRP piling, 30, FIGS. 16 and 17, system 600. The PFRP non-ballistic or ballistic sheeting, 4, overlaps the PFRP column, 32, and PFRP floor assembly, 25, to provide continuous coverage on the exterior side to prevent water and air intrusion, FIGS. 14 and 15, system 500. This method is repeated for a multi-story structure, FIGS. 14 and 16, which transfers the entire structural load to the concrete foundation, 27 of FIG. 15, or PFRP piling, 30 of FIGS. 16 and 17, systems 500 and 600. The PFRP non-ballistic or ballistic sheeting, 4, overlaps the PFRP column, 32, and PFRP floor assembly, 25, to provide continuous coverage on the exterior side to prevent water and air infiltration, FIG. 15, systems 500 and 600.

Figure 17:
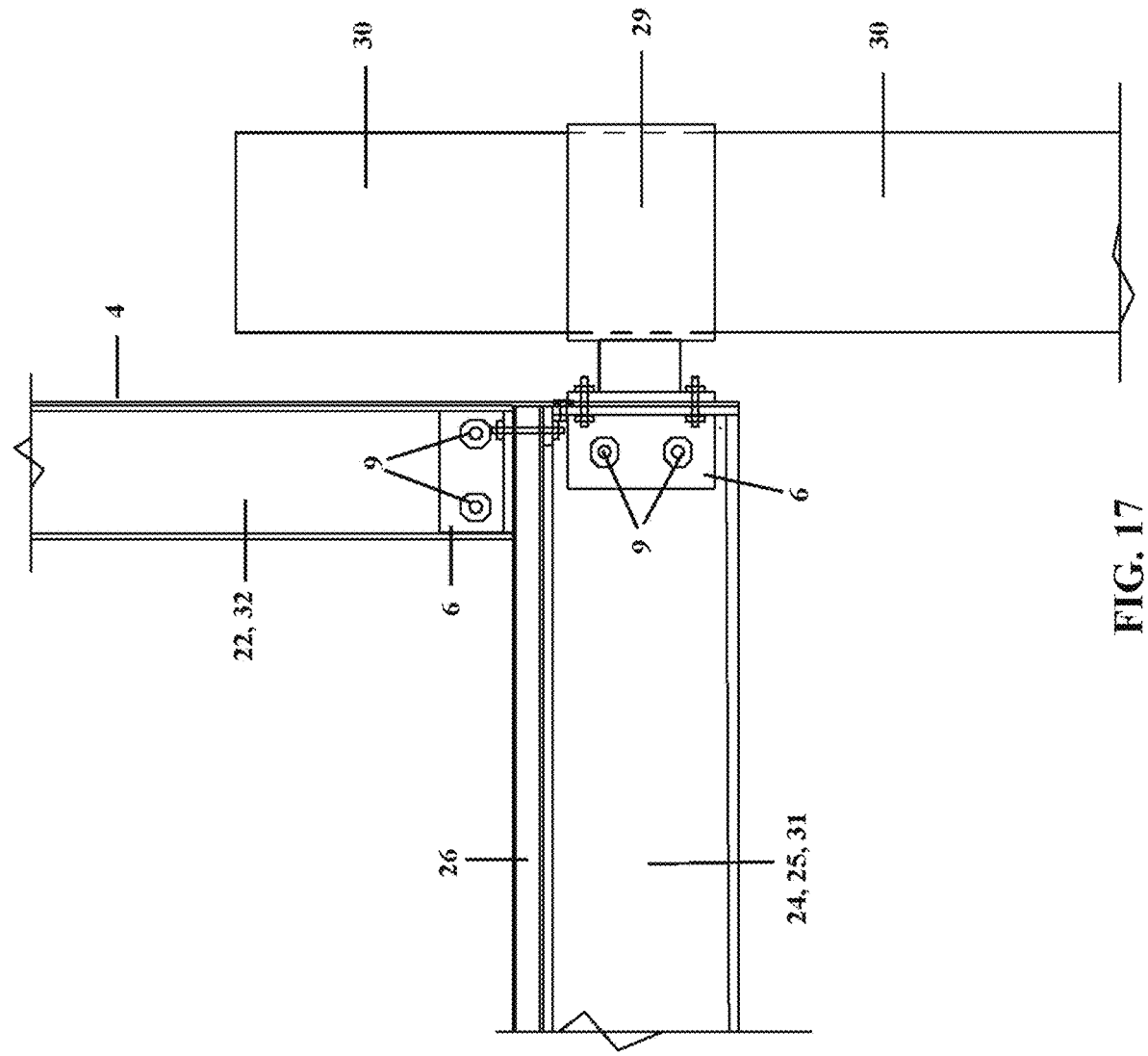
FIG. 17 is a schematic representation of the components and function of a PFRP wall and floor assembly connected to a PFRP piling with a PFRP flange

The PFRP floor assembly, 25, can connect to a PFRP pilling, 30, to elevate the structure off of the ground, FIGS. 16 and 17, systems 500 and 600. The PFRP pilling, 30, contains a PFRP flange, 29 of FIG. 17, which uses a PFRP bolt or traditional bolt and flexible epoxy to connect the PFRP floor assembly to the PFRP flange, FIG. 17. In addition, flexible epoxy is applied between the PFRP flange, 29, and PFRP piling, 30, and PFRP floor assembly, 25, FIG. 17, to form a permanent bond along with a mechanical connection.

Figure 18:
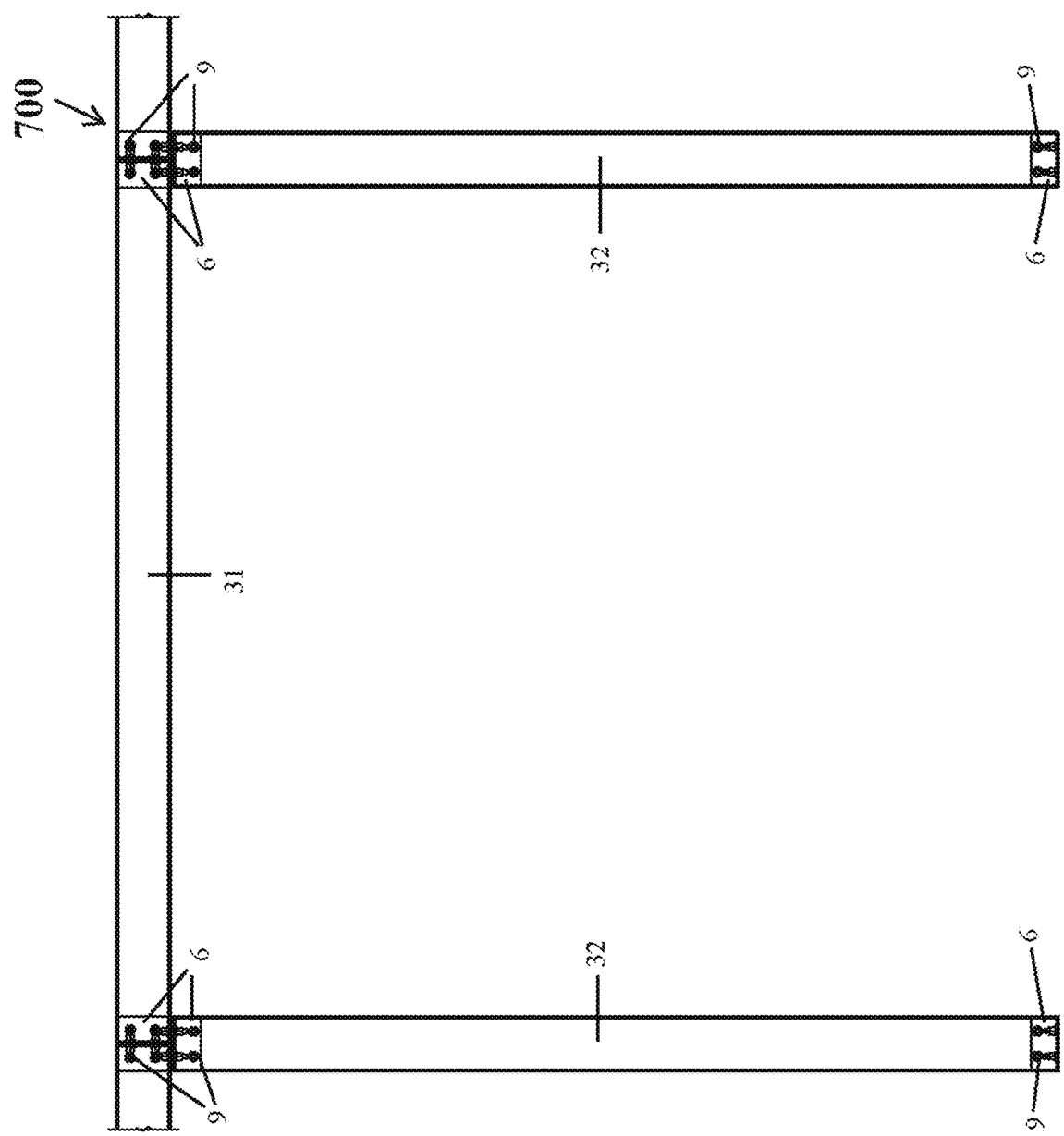
FIG. 18 is a schematic representation of the components and function of a PFRP I-beam or Wide Flange horizontal beam and vertical column structure

The PFRP structural assembly, system 700, FIG. 18, consists of an PFRP I-beam, 32, or PFRP wide flange vertical column, 32, and an PFRP I-beam, 31, or PFRP wide flange horizontal beam, 31, which are connected via a PFRP clip angle bracket, 6, and PFRP bolts or traditional bolts. The PFRP I-beam, 32, or PFRP wide flange columns, 32, are connected to an PFRP floor assembly, 25, via a PFRP clip angle bracket, 6, into a concrete foundation, 27, via a traditional concrete anchor or connected to an PFRP floor assembly, 25, using PFRP bolts or traditional bolts. This PFRP frame assembly, system 700, is unique in that it can be used to construct a residential, commercial, or mobile structure. In a PFRP mobile configuration the PFRP frame, system 700, can use traditional wheel assemblies to make the structure mobile.

In constructing a PFRP residential, commercial, or mobile structure the method begins with system 100. Each structure's foundation will define in what order the PFRP components are assembled. Relating to a PFRP structure using a conventional concrete foundation, 27, FIG. 15, the PFRP assembly begins with constructing the PFRP wall assembly, 22, system 100. Using the PFRP frame assembly, system 100, components connect the PFRP non-ballistic or PFRP ballistic sheeting, 4, to the PFRP frame assembly, system 100, using traditional self-drilling screws, 7, 8 or 9, FIG. 3, and a flexible epoxy which bonds the PFRP non-ballistic or PFRP ballistic sheeting, 4, to the PFRP frame assembly, system 100, creating a one-piece composite wall assembly, FIG. 1 and FIG. 2, which increases the wall panel strength, increases shear wall performance and prevents water or air intrusion. This assembly method would also apply to connecting a PFRP frame assembly, system 100 and system 200, to an architectural precast concrete cladding or tilt wall exterior wall covering, 15, FIG. 10 and FIG. 13.

When connecting system 100 to system 600, the PFRP pilings, 30, FIG. 16, are installed first. The PFRP floor assembly, 25 of system 400, is then connected to the PFRP pilings, 30 of system 600, via the PFRP flange, 29, FIG. 16 and FIG. 17. System 100 is then erected and connected to the PFRP floor assembly, 25 of system 400. In other configurations, the PFRP floor system, 25 of system 400, can contain a PFRP flange, 29, mounted to the outside of the PFRP floor frame, 25, and on each corner, FIG. 17. A PFRP piling, 30, can then be inserted into the PFRP flange, 29, allowing the PFRP structure to move freely up and down the PFRP piling, 30, FIG. 17. This configuration would be practicable for a floating PFRP structure when applying foam or other buoyant materials within the PFRP floor assembly, 25, to allow the PFRP structure to float on water. The combination of the exterior mounted PFRP flange, 29, sliding freely along the PFRP piling, 30, would allow the floating PFRP structure to naturally adjust its height during tidal changes or changing water volumes/elevations.

When constructing a PFRP mobile structure, the horizontal PFRP I-beam or wide flange beam, 31, System 700, is first connected to the PFRP floor assembly, 25 of system 400. System 100 is then attached to the PFRP floor assembly, 25, and then system 300 is connected to system 100 to complete a complete PFRP mobile structure. A traditional wheel assembly can be mounted to system 700. Additional configurations allow a wheel assembly, or without a wheel assembly, the frame assembly of system 700 to accommodate attachment points on the PFRP horizontal I-beam or wide flange beam, 31, using a traditional heavy-duty "D" ring that will allow the mobile unit to be picked up by a crane or airlifted by a helicopter for transport. This mobile structure is similar in size but not in weight to a conventional "Conex" container or can be constructed without the PFRP walls or PFRP roof to allow for design as an open trailer.

In the above listed roof configuration, the PFRP roof assembly, system 300, attaching to the PFRP frame assembly of system 100 can accommodate a solar system, system 800, by using PFRP solar panel or solar tile, FIG. 19, when using the PFRP solar mounting method of FIG. 19, of system 800.

Figure 8:
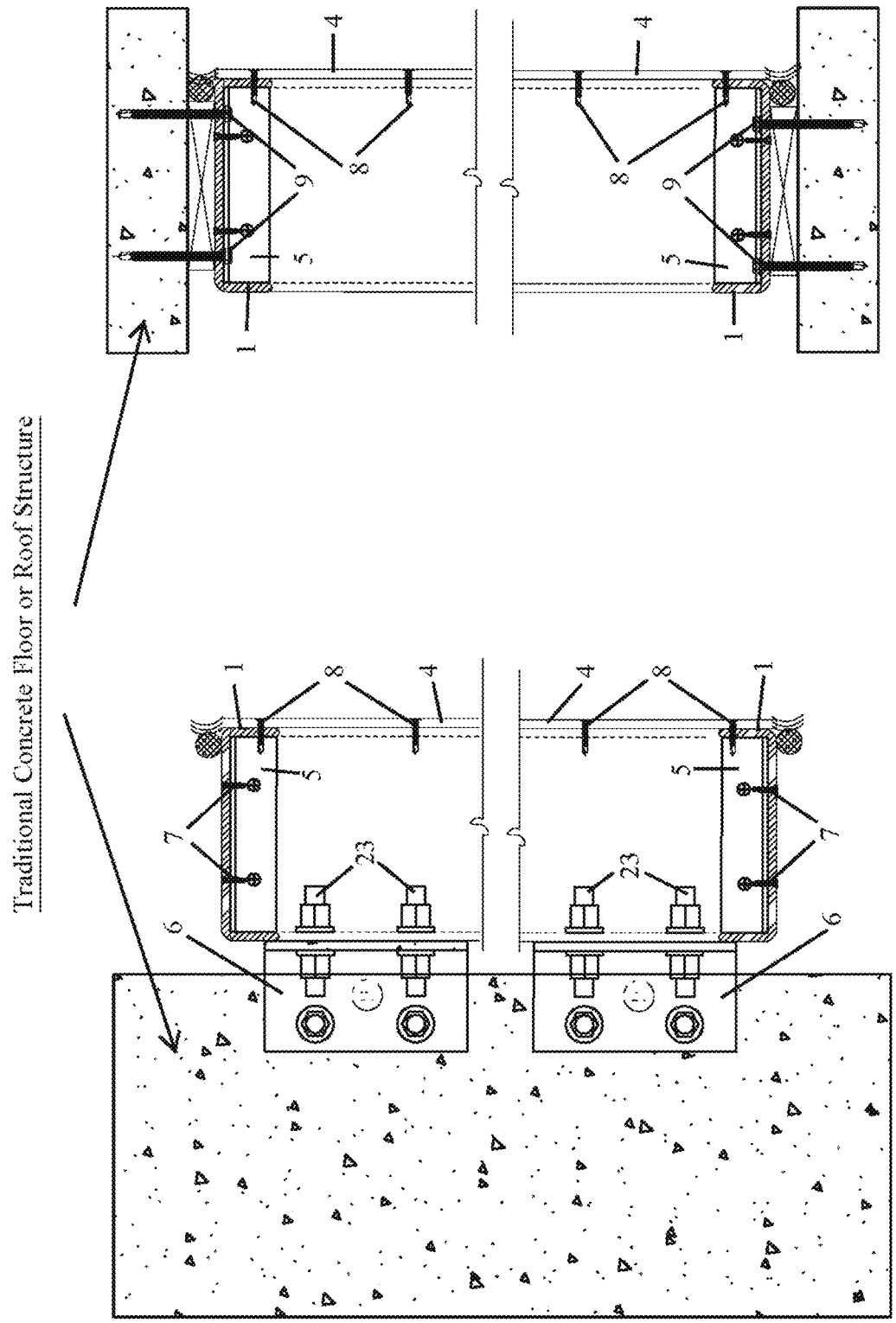
FIG. 8 is a schematic representation of the components and function of a PFRP wall assembly connecting to a traditional building structure using concrete
Figure 9:
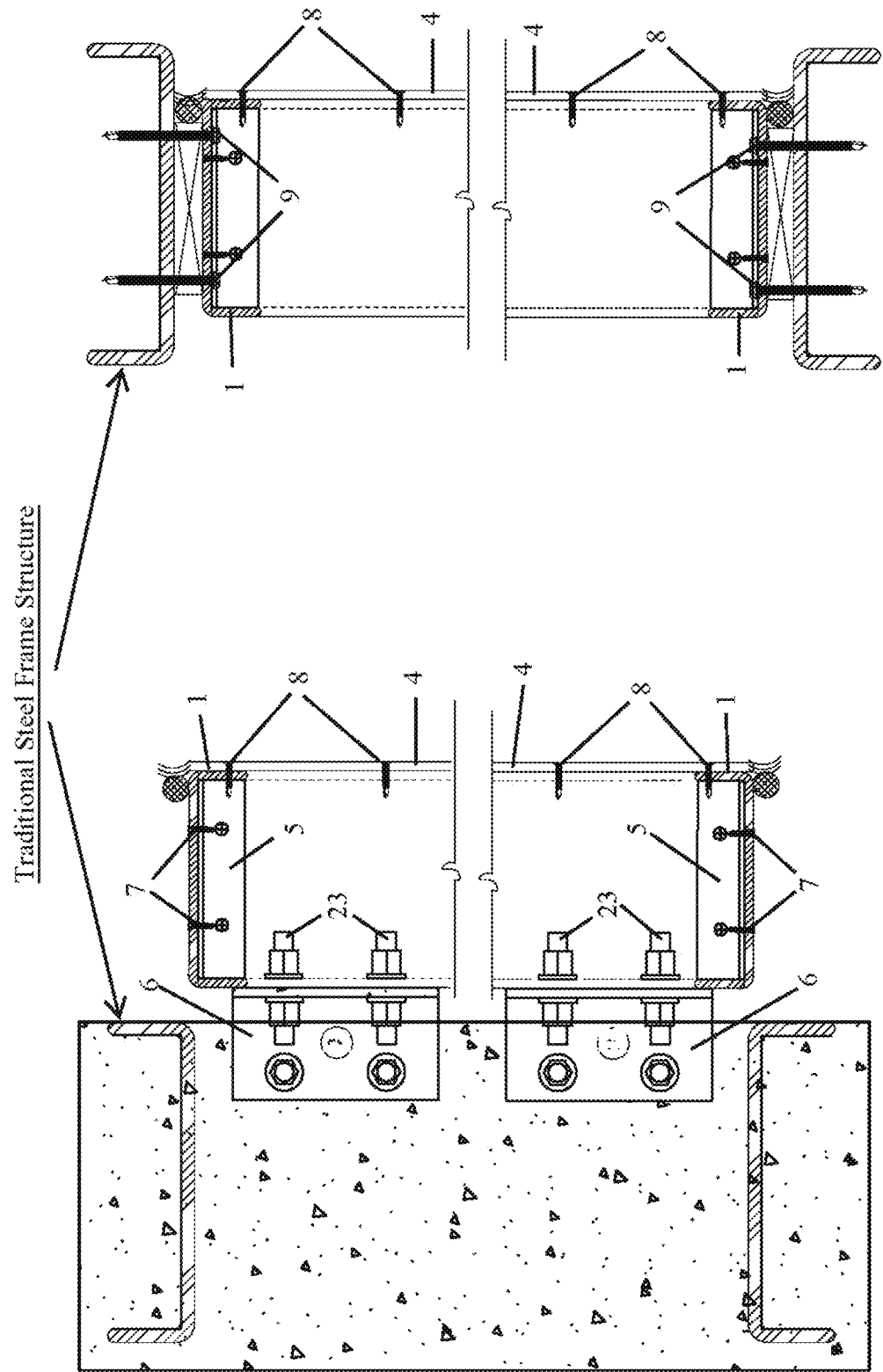
FIG. 9 is a schematic representation of the components and function of a PFRP wall assembly connecting to a traditional building structure using steel

Assembling the above listed configurations with part numbers 7, 8, 9 and 23, FIG. 8 and FIG. 9, combined with a flexible epoxy, allows the PFRP structure to function as one composite component enabling that component to become impervious to air or water and provides a uniform coefficient of thermal expansion throughout the PFRP component. Assembling all the components using this method of assembly will allow the complete PFRP structure to become impervious to air or water and provides a uniform coefficient of thermal expansion throughout the entire PFRP structure.

The lightweight advantage and ease of construction for the entire PFRP structure can allow a manufacturing facility to assemble the PFRP components for shipment via truck, rail, ship or aircraft as a modular unit or "Flat Packed" for easy shipment to other locations for final assembly to be a fixed or mobile structure.

The previous description is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:
1. An apparatus, comprising:
a solar panel or solar tile;
at least one pultrusion fiber reinforced polymer (PFRP) solar mounting bracket connected to the solar panel or solar tile, and at least one PFRP "Z"-bracket attached to the PFRP solar mounting bracket and configured to mount the solar panel or solar tile on a roof, the solar panel or solar tile providing for heating air under the solar panel or solar tile;

wherein the at least one PFRP "Z"-bracket is configured to elevate the solar panel or solar tile above the roof; and a ridge vent configured to receive and direct the heated air through a duct of a ventilation system configured to heat a building.

2. The apparatus of claim 1, wherein the at least one PFRP "Z"-bracket is configured to elevate the solar panel or solar tile a sufficient amount above the roof to increase solar power generation efficiency by at least 35%.

3. The apparatus of claim 1, wherein the at least one PFRP "Z"-bracket is configured to mount the solar panel or solar tile on at least one of a pitched-roof and a flat-roof.

4. The apparatus of claim 1, wherein the roof comprises a PFRP roof system.

5. The apparatus of claim 1, wherein the solar panel comprises at least one solar roof tile or solar roof tile.

6. The apparatus of claim 1, wherein the at least one PFRP "Z"-bracket is configured to elevate the solar panel or solar tile a sufficient amount above the roof to reduce thermal loading of the solar panel or solar tile and increase solar power generation efficiency.

\* \* \* \* \*